United States Patent
Coca et al.

(10) Patent No.: US 7,987,430 B2
(45) Date of Patent: Jul. 26, 2011

(54) APPARATUS, SYSTEM, AND METHOD FOR CUSTOMIZING A GRAPHICAL USER INTERFACE

(75) Inventors: Dinesh C. Coca, Tucson, AZ (US); James B. Engle, Green Valley, AZ (US); Melissa J. Garcia, Tucson, AZ (US); Kevan D. Holdaway, Hillsborough, NC (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 11/752,148

(22) Filed: May 22, 2007

(65) Prior Publication Data
US 2008/0295004 A1 Nov. 27, 2008

(51) Int. Cl.
*G06F 3/048* (2006.01)
*G06F 3/00* (2006.01)

(52) U.S. Cl. ........ 715/763; 715/744; 715/760; 715/841; 715/854

(58) Field of Classification Search .................. 715/760, 715/763, 841, 853, 854, 762, 765; 709/218, 709/224, 217, 223
See application file for complete search history.

(56) References Cited

U.S. PATENT DOCUMENTS

| | | | | |
|---|---|---|---|---|
| 6,047,320 | A * | 4/2000 | Tezuka et al. | 709/223 |
| 6,462,762 | B1 * | 10/2002 | Ku et al. | 715/853 |
| 6,577,319 | B1 | 6/2003 | Kashiwagi et al. | 345/581 |
| 6,857,124 | B1 | 2/2005 | Doyle | 719/316 |
| 6,934,749 | B1 * | 8/2005 | Black et al. | 709/224 |
| 6,985,912 | B2 * | 1/2006 | Mullins et al. | 1/1 |
| 7,028,306 | B2 * | 4/2006 | Boloker et al. | 719/310 |
| 7,117,432 | B1 * | 10/2006 | Shanahan et al. | 715/210 |
| 2002/0125787 | A1 | 9/2002 | Howard et al. | 310/254 |
| 2003/0070061 | A1 | 4/2003 | Wong et al. | 712/220 |
| 2003/0164859 | A1 | 9/2003 | Evans | 345/792 |
| 2003/0177175 | A1 | 9/2003 | Worley et al. | 709/203 |
| 2003/0225894 | A1 * | 12/2003 | Ito | 709/227 |
| 2004/0216042 | A1 | 10/2004 | Consolatti et al. | 715/513 |
| 2005/0125787 | A1 | 6/2005 | Tertitski et al. | 717/162 |
| 2005/0193368 | A1 | 9/2005 | Becker et al. | 717/106 |
| 2005/0198201 | A1 * | 9/2005 | Bohn et al. | 709/218 |
| 2005/0234884 | A1 | 10/2005 | Drukman et al. | 707/3 |
| 2006/0005207 | A1 | 1/2006 | Louch et al. | 719/328 |
| 2006/0015846 | A1 | 1/2006 | Fraleigh et al. | 717/109 |
| 2006/0129982 | A1 | 6/2006 | Doyle | 717/115 |
| 2006/0136014 | A1 * | 6/2006 | Simms | 607/60 |
| 2008/0109738 | A1 * | 5/2008 | Yao | 715/760 |

OTHER PUBLICATIONS

IBM, Client side customization of widgets and layout, Technical Disclosure, ip.com, Jul. 21, 2006, http://www.ip.com/pubview/IPCOM000138499D.

* cited by examiner

*Primary Examiner* — Nicholas Augustine
(74) *Attorney, Agent, or Firm* — Kunzler Needham Massey & Thorpe

(57) ABSTRACT

An apparatus, system, and method are disclosed for customizing a graphical user interface. A rendition module renders a base GUI to provide an operator with tools for managing Data Processing Devices (DPD). A tag module communicates interface tags to the base GUI. The interface tags describe added functionality for managing a specified DPD, wherein the added functionality is not supported by the base GUI and the base GUI is not configured to employ the interface tags. A translation module translates the interface tags into interpreted display code. The rendition module is further configured to render the interpreted display code with previously rendered display code for the base GUI to provide the added functionality for managing the specified DPD. The operator may manage the specified DPD with the added functionality.

17 Claims, 6 Drawing Sheets

APPARATUS, SYSTEM, AND METHOD FOR CUSTOMIZING A GRAPHICAL USER INTERFACE

BACKGROUND OF THE INVENTION

1. Field of the Invention

This invention relates to customizing an interface and more particularly relates to customizing a graphical user interface.

2. Description of the Related Art

Data processing devices (DPD) such as servers, mainframe computers, switches, routers, bridges, storage devices, and the like are often managed from a computer workstation. An operator may employ a graphical user interface (GUI) rendered by the computer workstation to manage the DPD. For example, the operator may initialize a DPD hard disk drive through a GUI configured to manage the hard disk drive.

It is often advantageous for an operator to mange heterogeneous DPDs using a single GUI. As used herein, heterogeneous DPDs refer to DPDs of different makes and/or models. Some GUIs may be compliant with the Storage Management Initiative—Specification (SMI-S) developed by the Storage Networking Industry Association (SNIA). SMI-S employs a common information model and web-based enterprise management standards. A SMI-S compliant GUI may communicate with a plurality of heterogeneous DPD.

Thus the operator may use a single SMI-S compliant GUI to manage a RAID storage system from a first manufacturer and an optical storage device array from a second manufacturer. In addition, DPDs that are added for management by the GUI after the installation of the GUI may also be supported.

Unfortunately, some DPD may support features and functionality that are not supported by a base GUI. For example, a SMI-S compliant GUI may not support a storage device's restore feature. The problem is exacerbated as manufacturers create DPD with features and functionality specifically designed to differentiate the DPD in the market.

SUMMARY OF THE INVENTION

From the foregoing discussion, there is a need for an apparatus, system, and method that customizes a GUI. Beneficially, such an apparatus, system, and method would allow a GUI to support non-standard functionality.

The present invention has been developed in response to the present state of the art, and in particular, in response to the problems and needs in the art that have not yet been fully solved by currently available GUI. Accordingly, the present invention has been developed to provide an apparatus, system, and method for customizing a GUI that overcome many or all of the above-discussed shortcomings in the art.

The apparatus to customize a GUI is provided with a plurality of modules configured to functionally execute the steps of rendering a base GUI, communicating interface tags to the base GUI, translating the interface tags into interpreted display code, and rendering the interpreted display code. These modules in the described embodiments include a rendition module, a tag module, and a translation module. The rendition module renders a base GUI to provide an operator with tools for managing DPD. The tag module communicates interface tags to the base GUI. The interface tags describe added functionality for managing a specified DPD, wherein the added functionality is not supported by the base GUI and the base GUI is not configured to employ the interface tags. The translation module translates the interface tags into interpreted display code. The rendition module is further configured to render the interpreted display code with previously rendered display code for the base GUI to provide the added functionality for managing the specified DPD. The operator may manage the specified DPD with the added functionality.

In one embodiment, the rendition module may be configured as a browser. The interpreted display code may be configured as a script code such as Hypertext Markup language (HTML) code or JavaScript codes. The interface tags may be web framework tags such as JavaServer Faces (JSF) tags. The DPD may be configured as a storage device. Alternatively, the base GUI may be configured as a web framework page such as a JavaServer page. In an alternate embodiment the interface tags may be configured as an Extensible Markup Language (XML) file. This would allow for enhanced customization capabilities within the browser as components could be added or modified with the client-side function handling translation on the fly. The apparatus customizes the GUI to support the added functionality.

The system to customize a GUI comprises of a memory module and a processor module. The processor module comprises a rendition module configured to render a base GUI to provide an operator with tools for managing a plurality of DPDs. The processor module also includes a tag module configured to communicate interface tags to the base GUI. The interface tags describe added functionality for managing a specified DPD. The added functionality is not supported by the base GUI and the base GUI is not configured to employ the interface tags.

The translation module translates the interface tags into interpreted display code and the rendition module further renders the interpreted display code with previously rendered display code for the base GUI to provide the added functionality for managing the specified DPD. The operator may manage the specified DPD with the added functionality.

The plurality of DPD may be configured as servers. The ability to dynamically add complex widgets on the fly would allow for more flexibility and creativity in page design. The system supports a more dynamic GUI resulting in increased usability and responsiveness for the operator.

A method of the present invention is also presented for deploying computer infrastructure. The method in the disclosed embodiments substantially includes the steps to carry out the functions presented above with respect to the operation of the described apparatus and system.

A rendition module renders a base GUI configured to provide an operator with tools for managing a plurality of storage devices. A tag module communicates interface tags to the base GUI, wherein the interface tags describe added functionality for managing a specified storage device. The added functionality is not supported by the base GUI and the base GUI is not configured to employ the interface tags.

A translation module translates the interface tags into interpreted display code and the rendition module further renders the interpreted display code with previously rendered display code for the base GUI to provide the added functionality for managing the specified storage device. The operator may manage the specified storage device with the added functionality.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention customizes a GUI, allowing additional functionality to be supported. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays (FPGAs), programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within the modules, and may be embodied in any suitable form and organized within any suitable type of data structure. The operational data may be collected as a single data set, or may be distributed over different locations including different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
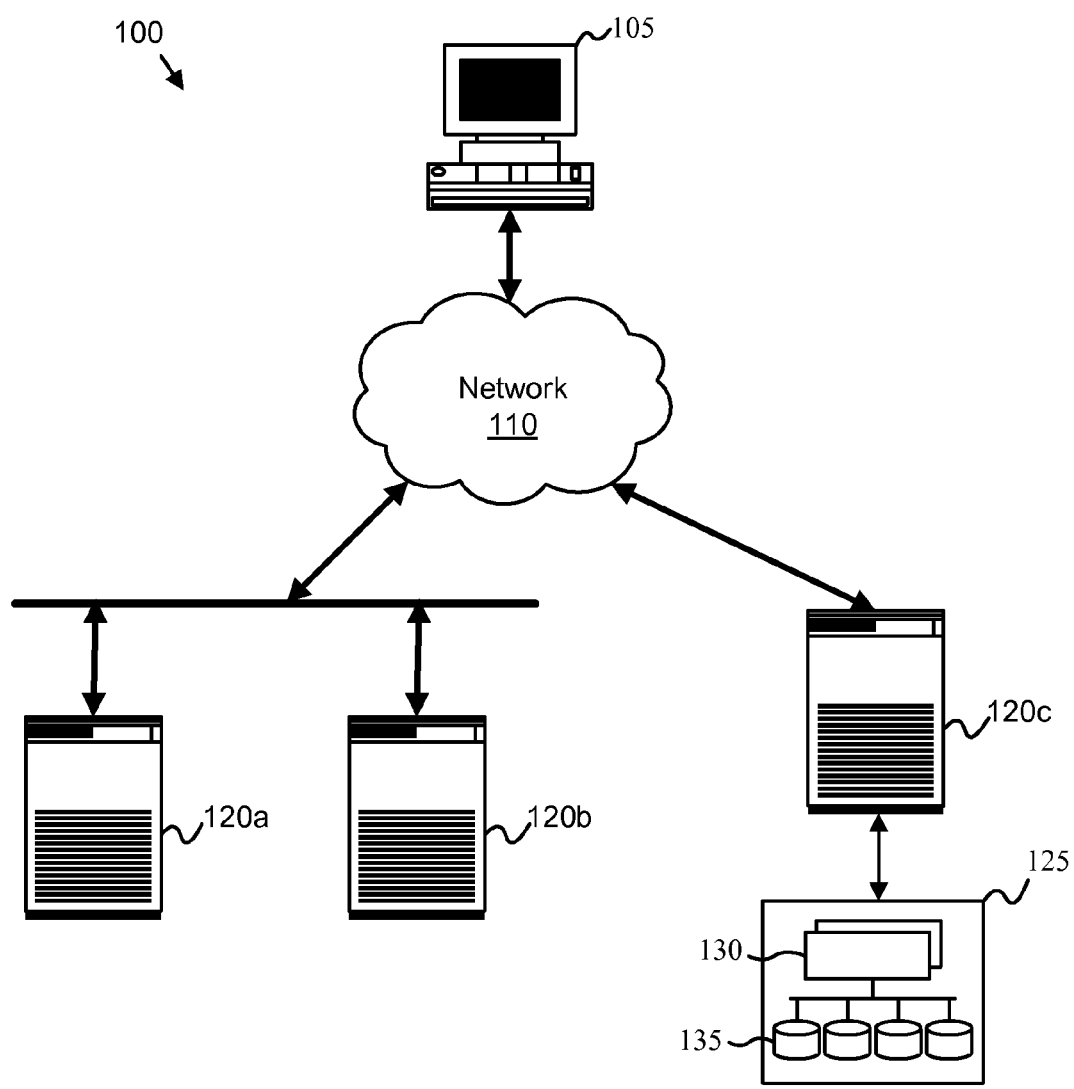
FIG. 1 is a schematic block diagram illustrating one embodiment of a data processing system in accordance with the present invention.

FIG. 1 depicts a data processing system (DPS) 100 in accordance with the present invention. The DPS 100 includes a computer 105, a network 110, one or more servers 120, and a storage subsystem 125.

The servers 120 may also be configured as mainframe computers, blade centers comprising multiple blade servers, and the like. One of skill in the art will also readily recognize that the DPS 100 could include other data processing devices such as bridges, scanners, printers, and the like.

The storage subsystem 125 includes one or more storage controllers 130 and one or more storage devices 135. The storage devices 135 may be hard disk drives, optical storage devices, magnetic tape drives, micromechanical storage devices, holographic storage devices, and semiconductor storage devices.

In one embodiment, the DPS 100 provides data storage and/or data manipulation services for the computer 105 and/or for other clients (not shown). For example, a client may access data stored on a storage device 135 of the storage subsystem 125 by communicating a request through the network 110 and a third server 120c to the storage controller 130 for the storage device 135. The storage controller 130 may retrieve the data from the storage device 135 and communicate the data to the client.

The computer 105 uses a console framework to manage the servers 120 and/or the storage subsystem 125. The console framework is referred to hereafter as a GUI. The GUI may comprise one or more application programs that display status for and manage the servers 120 and storage subsystem 125. Using the application programs the software console may be rendered to manage heterogeneous DPDs.

As used herein, heterogeneous DPDs refer to DPDs of different makes and/or models. A SMI-S compliant GUI may communicate with a plurality of heterogeneous DPD. Thus the operator may use a single SMI-S compliant GUI to manage a RAID storage system from a first manufacturer and an optical storage device array from a second manufacturer.

In addition, DPDs that are added after the installation of the GUI may also be supported. Unfortunately, some DPD may support features and functionality that are not supported by the GUI. For example, a SMI-S compliant GUI may not support a storage device's particular restore feature. Hence the need for customizing the GUI to support non-standard functionality arises.

Figure 2:
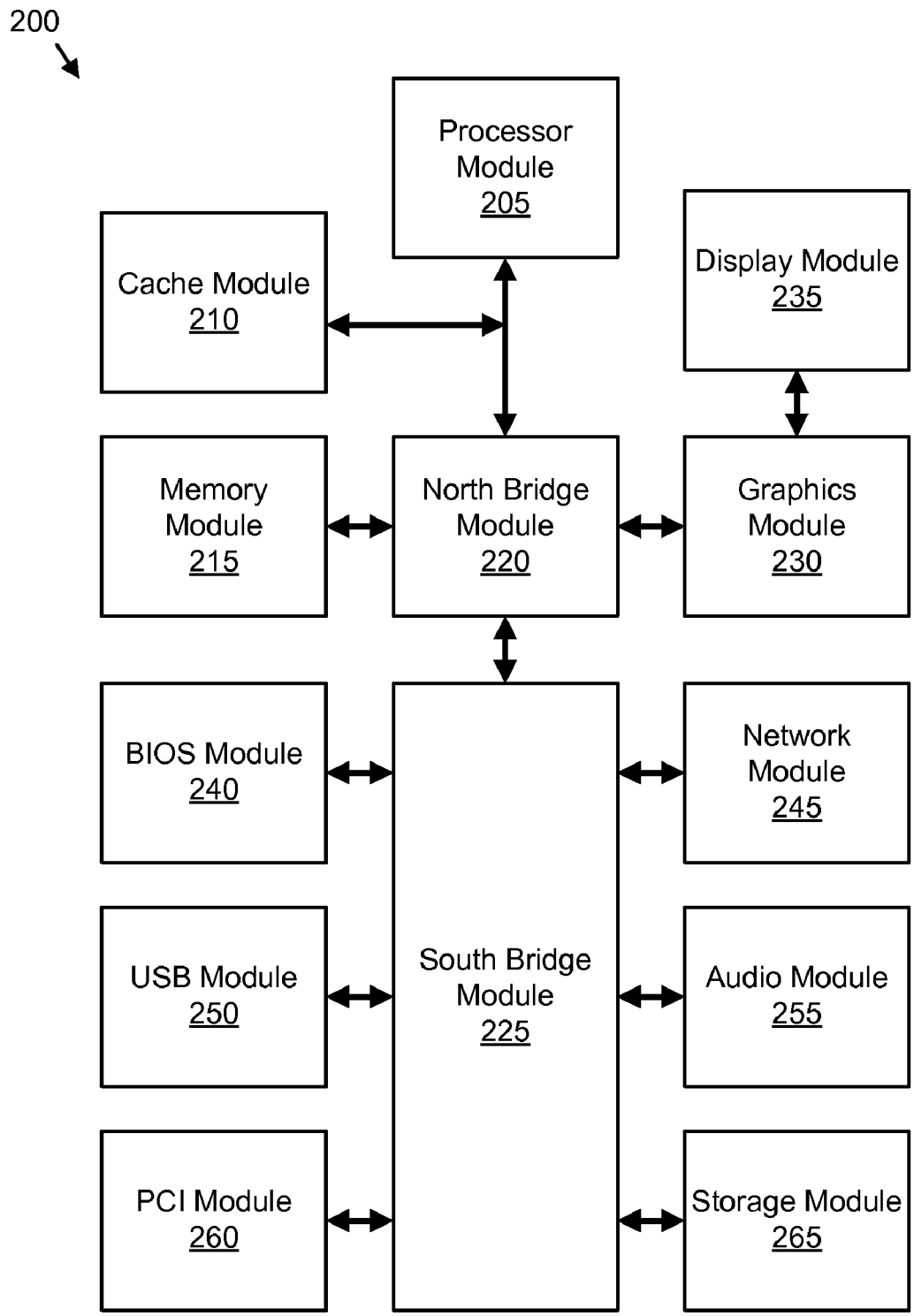
FIG. 2 is a schematic block diagram illustrating one embodiment of a computer in accordance with the present invention.

FIG. 2 is a schematic block diagram illustrating one embodiment of a computer 200 in accordance with the present invention. The computer 200 includes a processor module 205, a cache module 210, a memory module 215, a north bridge module 220, a south bridge module 225, a graphics module 230, a display module 235, a BIOS module 240, a network module 245, a USB module 250, an audio module 255, a Peripheral Component Interconnect (PCI) module 260, and a storage module 265.

The processor module 205, cache module 210, memory module 215, north bridge module 220, south bridge module 225, graphics module 230, display module 235, BIOS module 240, network module 245, USB module 250, audio module 255, PCI module 260, and storage module 265, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The processor module 205 executes one or more computer readable programs that comprise the GUI and receives user input from user input devices (not shown). The processor module 205 is coupled to a memory module 215 and one or more direct access storage devices. As is known to one skilled in the art the memory module 215 may be utilized for storing data sets and application programs.

The cache module 210 may store frequently accessed data on a temporary basis for rapid access. The north bridge module 220 handles communication between the processor module 205, memory module 215, PCI module 260 and the south bridge module 225. The BIOS module 240 prepares the computer 200 so that the computer readable programs stored on various media can load, execute and assume control of the computer 105.

The processor module 205 executes the software instructions and manipulates the data as is well know to those skilled in the art. The software instructions and data may be configured as one or more computer program products. The computer program products may be tangibly stored in the storage module 265. The storage module 265 may be a hard disk drive, an optical storage device, a holographic storage device, a micromechanical storage device, a semiconductor storage device, or the like.

Figure 3:
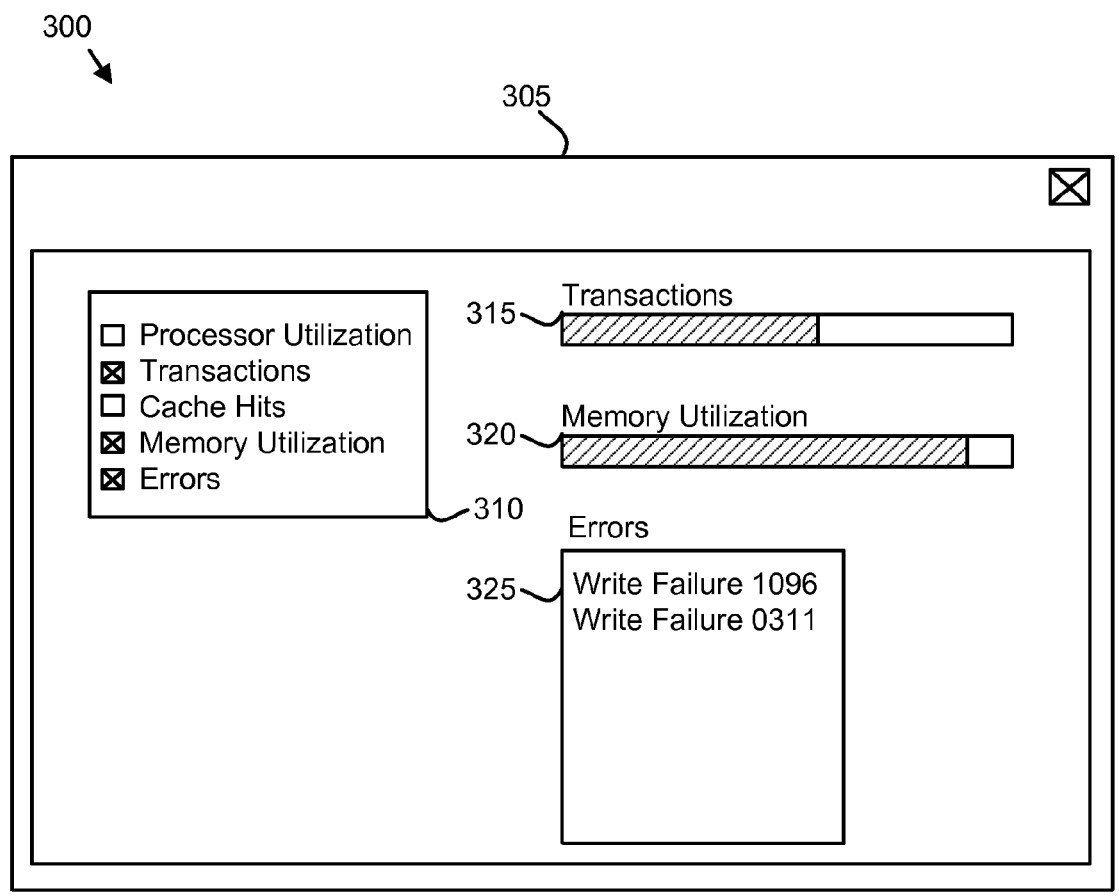
FIG. 3 is a drawing illustrating one embodiment of a base GUI in accordance with the present invention.

FIG. 3 is a schematic block diagram illustrating one embodiment of a GUI 300 in accordance with the present invention. As is known to those skilled in the art, GUIs such as SMI-S compliant consoles are used to manage devices. The diversity of devices and users make it difficult to write one GUI to manage multiple devices. GUI's may be developed with JSF or JSF Widget Library (JWL). While JSP provides dynamic GUI generation, JSF and JWL have strict limitations. This is due to JWL and JSF using an XML format that is rendered into HTML and JavaScript on the server-side. While this supports drag-and-drop programming, using JWL and JSF limits the customizability of the GUI 300 and how dynamic the GUI 300 can be.

The GUI 300 as shown in FIG. 3 may include a display window 305. The window 305 displays a metric selection box 310, a transaction monitor 315, a memory utilization monitor 320, and an error list 325.

In one embodiment, the metric selection box 310 includes the following parameters; processor utilization, transactions, cache hits, memory utilization and errors. The GUI enables the operator to monitor the system by selecting any of the check boxes to receive the desired output.

For example if the operator requires transactions, memory utilization and errors, the operator needs to select those check boxes and the result is displayed in the respective monitors. This enables the operator to configure information displayed by the GUI 300.

In one embodiment, the transaction monitor 315 monitors transactions. As is known to one skilled in the art, a transaction is a unit of interaction with a database management system or similar system that is treated in a coherent and reliable way independent of other transactions that must be either entirely completed or aborted. When a transaction completes successfully, database changes are said to be committed. When a transaction does not complete, changes are rolled back. Transactions may include active transactions, transactions committed, transactions committed per minute, transactions rolled back or transactions rolled back per minute.

In one embodiment, the memory utilization monitor 320 monitors memory of the system. As may be known to one skilled in the art memory utilization may be determined by pages in or pages out, active/inactive pages, free, shared, buffered and cached pages, swaps in or swaps out. By using these statistics it is possible to determine the mix of memory utilization.

In the depicted embodiment, the error list 325 displays recent errors. For example, the error list 325 is shown displaying two write failure errors with error numbers. In one embodiment, the GUI 300 displays SMI-S compliant console. The SMI-S console may be unable to provide functionality to support a specified DPD. The present invention allows support for the specified DPD as will be described hereafter.

Figure 4:
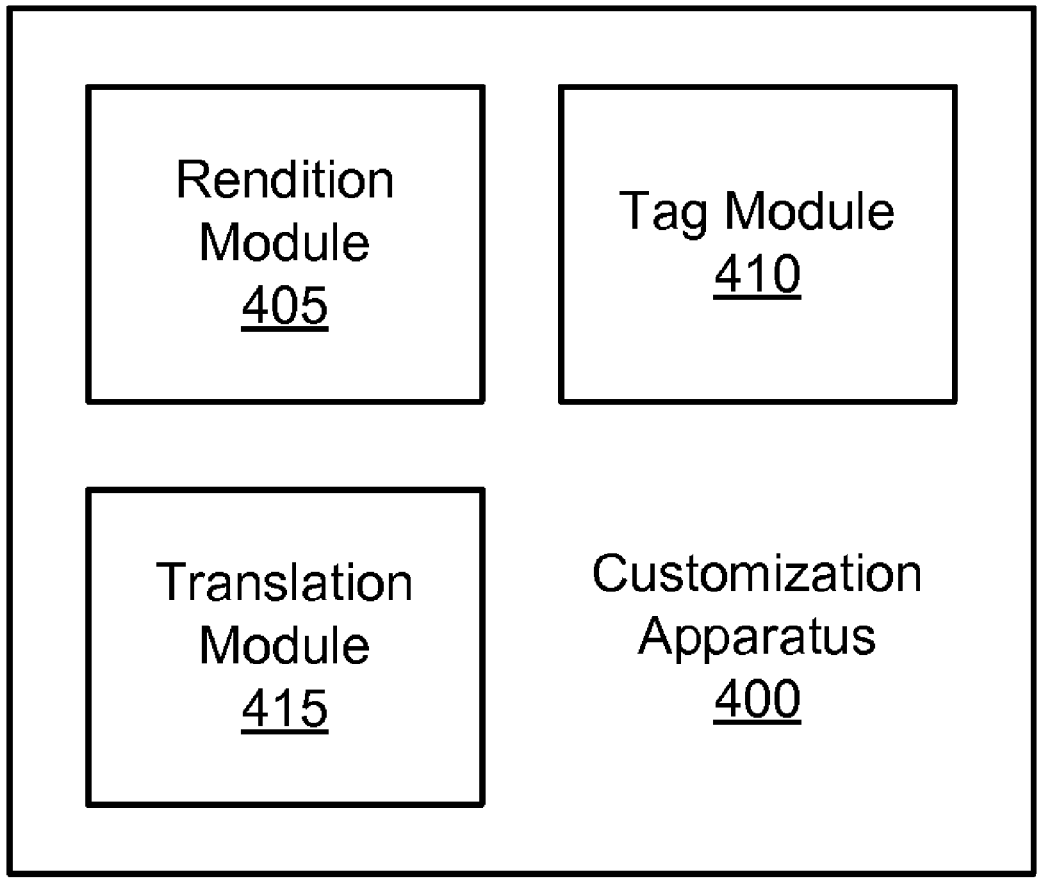
FIG. 4 is a schematic block diagram illustrating one embodiment of a customization apparatus of the present invention.

FIG. 4 is a schematic block diagram illustrating one embodiment of a customization apparatus 400 of the present invention. The customization apparatus 400 includes rendition module 405, tag module 410 and translation module 415. The description of the apparatus 400 refers to elements of FIGS. 1-3, like numbers referring to like elements.

The rendition module 405 renders a base GUI such as the GUI 300 of FIG. 3 to provide the operator with tools for managing DPD. The tag module 410 communicates interface tags to the base GUI. The interface tags describe added functionality for managing a specified DPD, wherein the added functionality is not supported by the base GUI 300 and the base GUI 300 is not configured to employ the interface tags.

The translation module 415 translates the interface tags into interpreted display code. The rendition module 405 is configured to render the interpreted display code with previously rendered display code for the base GUI 300 to provide the added functionality for managing the specified DPD. The operator may manage the specified DPD with the added functionality.

In one embodiment the rendition module 405 may be configured as a browser. The interpreted display code may be configured as HTML code or JavaScript codes. The interface tags may be JSF tags. The DPD may be configured as a storage device. Alternatively, the base GUI may be configured as a Java server page and the interface tags may be configured as an XML file.

For example, the translation module 415 may include a widget translation function added to the client-side that handles the dynamic addition of widgets by translating widget tags into HTML and JavaScript. This could either be implemented via JavaScript code that makes asynchronous calls back to the server or through a browser plug-in. This would allow for enhanced customization capabilities within the browser as components could be added or modified with the client-side function handling translation on the fly. The apparatus 400 customizes the GUI 300 to support the added functionality.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method.

Figure 5:
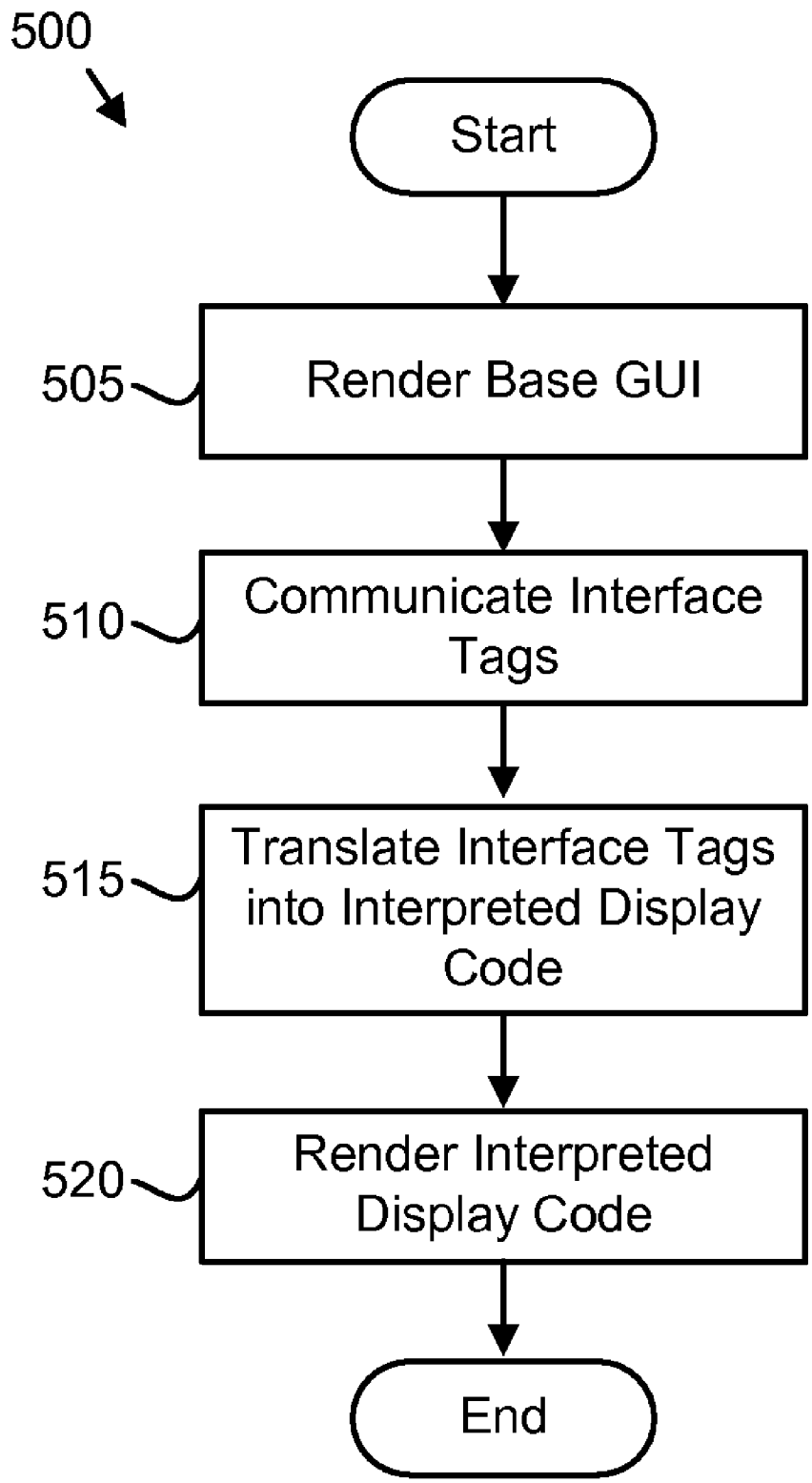
FIG. 5 is a schematic flow chart diagram illustrating one embodiment of a method of customizing a GUI in accordance with the present invention.

FIG. 5 is a schematic flow chart diagram illustrating one embodiment of a method 500 of customizing a GUI in accordance with the present invention. The method 500 of customizing a GUI substantially includes the steps to carry out the functions presented above with respect to the operation of the described apparatus and system of FIGS. 1-4. In one embodiment, the method 500 is implemented with a computer program product comprising a computer readable medium having a computer readable program. The computer readable program may be integrated into a computing system such as the computer 200, wherein the program in combination with the computing system is capable of performing the method 500.

The method 500 begins and the rendition module 405 renders 505 a base GUI. The rendition module 405 may be configured as a browser. The base GUI is configured to provide an operator with tools for managing a plurality of storage devices 505. For example, a web browser may render the base GUI from HTML commands generated by a SMI-S compliant computer readable program.

The tag module 410 communicates 510 interface tags to the base GUI. The interface tags may be JSF interface tags. The interface tags describe added functionality for managing a specified storage device. However, the added functionality is not supported by the base GUI and the base GUI is not configured to employ the interface tags.

The translation module 415 translates 515 the interface tags into interpreted display code. The functionality could be added to browsers by using a browser plug-in. As known to one skilled in the art, custom tags are packaged into tag libraries, which contain a set of tags and the objects that implement the tags. Access to a tag library occurs through an XML file known as a tag library descriptor (TLD). During JSP translation, any custom tag is converted into a call to the object implementing the tag, also known as a tag handler. The JSP compiler uses the TLD file referenced in the uri attribute of the taglib directive to determine what Java class to employ for a particular custom tag.

In one embodiment, the translation module 415 inserts the interpreted display code into code segments that comprise the original base GUI 300. In addition, the translation module 415 may modify the base GUI code segments. For example, the translation module 415 may modify the size and position of base GUI elements to make room for the elements rendered with the interpreted display code.

The rendition module 405 further renders 520 the interpreted display code with previously rendered display code for the base GUI to provide the added functionality for managing the specified storage device. The operator may manage the specified storage device with the added functionality.

In one embodiment, the rendition module 405 may render 520 with a widget translation function added to the client-side that dynamically adds addition of widgets by translating widget tags into HTML and JavaScript. This may be implemented via JavaScript code that makes asynchronous calls back to the server. This would allow for enhanced customization capabilities within the browser, as components could be modified or added, with the client-side function handling translation on the fly.

Figure 6:
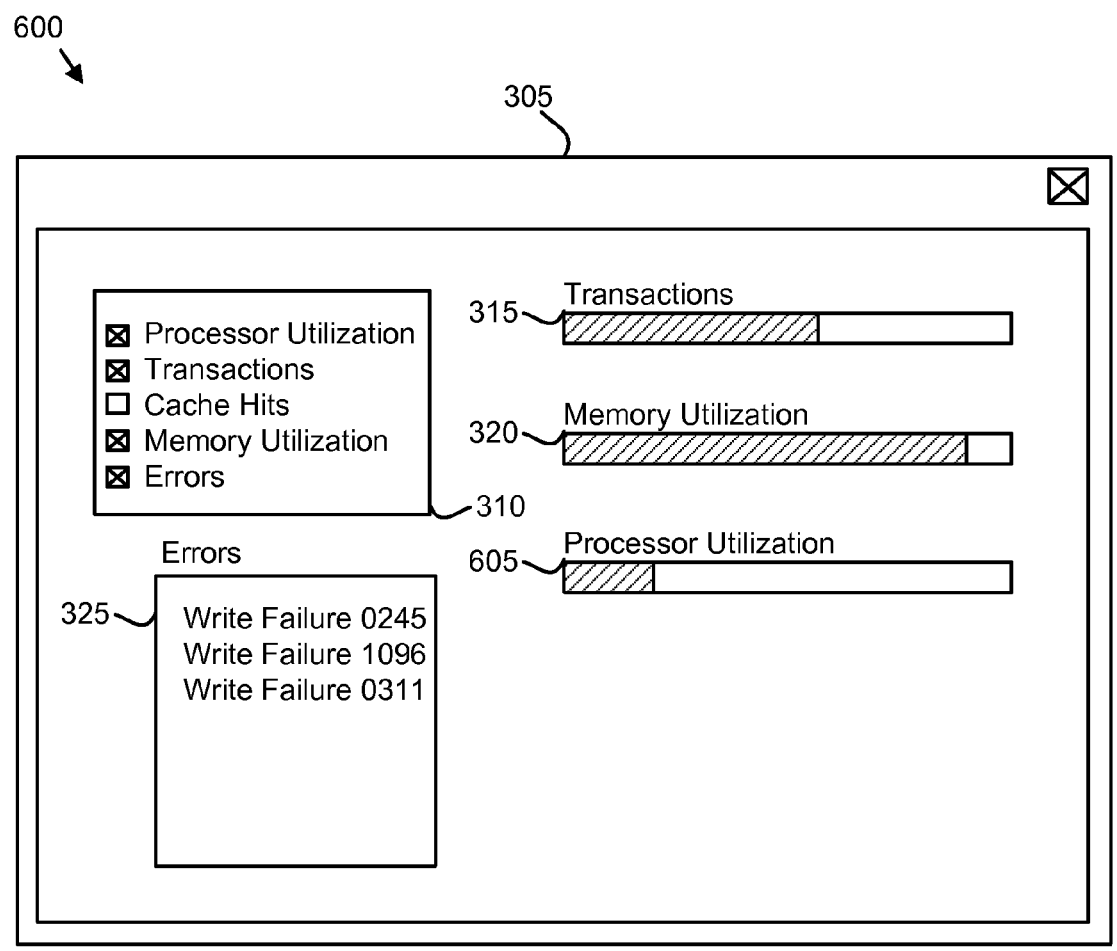
FIG. 6 is a drawing illustrating one embodiment of a customized GUI in accordance with the present invention.

FIG. 6 is a drawing illustrating one embodiment of a customized GUI 600 in accordance with the present invention. The GUI 600 as shown in FIG. 6 is a prophetic example of customizing the base GUI 300 of FIG. 3. The description of the GUI 600 refers to elements of the GUI 300 of FIG. 3, like numbers referring to like elements. In addition to the transaction monitor 315, the memory utilization monitor 320, the error list 325, the GUI 600 in this embodiment also includes a processor utilization monitor 605 to display the processor utilization of the system.

The GUI 600 shows that the user has selected a processor utilization monitor from the metric selection box 310. The GUI 600 may originally be unable to provide the processor utilization monitor. However, the tag module 410 communicates 510 interface tags to the GUI 600 that translation module 415 translates 415 into interpreted display code 515. The rendition module 405 renders 520 the interpreted display code with previously rendered display code for the original base GUI 300 to provide the added functionality of a processor utilization monitor 605.

In the depicted embodiment, the rendition module 405 modifies the rendition of the error list 325 of the original base GUI 300, moving the error list 325 to an alternate position. The rendition module 405 changes the layout, presentation order, and the like of elements in order to support the added functionality. For example, the rendition module 405 may render 520 one or more elements with a smaller size relative to the elements' sizes in the base GUI 300 in order to fit added functionality within a specified area.

In one embodiment, the rendition module 405 renders 520 the added functionality as a link, button, or the like that gives the user access to an additional GUI with the added functionality. For example, clicking on the processor utilization monitor 605, the rendition module 405 may display an additional GUI with monitors and controls for processors.

The present invention customizes a GUI 600, allowing additional functionality to be supported. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to customize a graphical user interface (GUI), the apparatus comprising:
   a memory storing executable code;
   a processor executing the executable code, the executable code comprising:

a rendition module configured to render a base GUI that provides an operator with tools for managing data processing devices (DPD);

a tag module configured to communicate interface tags to the base GUI, wherein the interface tags are JavaServer Faces Tags and describe added functionality for managing a specified DPD, the base GUI is a Storage Management Initiative—Specification (SMI-S) compliant GUI, the added functionality is not supported by the base GUI, and the base GUI is not configured to employ the interface tags;

a translation module translate the interface tags into interpreted display code; and the rendition module further configured to insert the interpreted display code into code segments of the base GUI, modify a size and a position of base GUI elements to make room for elements rendered with the interpreted display code, and render the interpreted display code with the modified base GUI code segments to provide the added functionality for managing the specified DPD, wherein the operator may manage the specified DPD with the added functionality.

2. The apparatus of claim 1, wherein the rendition module is configured as a browser.

3. The apparatus of claim 1, wherein the interpreted display code is configured as Hypertext Markup Language (HTML) code.

4. The apparatus of claim 1, wherein the interpreted display code is configured as script code.

5. A computer program product comprising a memory storing a computer readable program, wherein the computer readable program when executed on a computer causes the computer to:

render a base graphical user interface (GUI) configured to provide an operator with tools for managing data processing devices (DPD);

communicate interface tags to the base GUI, wherein the interface tags are JavaServer Faces Tags and describe added functionality for managing a specified DPD, the base GUI is a Storage Management Initiative—Specification (SMI-S) compliant GUI, the added functionality is not supported by the base GUI, and the base GUI is not configured to employ the interface tags;

translate the interface tags into interpreted display code;

insert the interpreted display code into code segments of the base GUI;

modify a size and a position of base GUI elements to make room for elements rendered with the interpreted display code; and render the interpreted display code with the modified base GUI code segments to provide the added functionality for managing the specified DPD, wherein the operator may manage the specified DPD with the added functionality.

6. The computer program product of claim 5, wherein the base GUI is rendered by a browser.

7. The computer program product of claim 6, wherein the interpreted display code is configured as Hypertext Markup Language (HTML) code.

8. The computer program product of claim 6, wherein the interpreted display code is configured as script code.

9. The computer program product of claim 5, wherein the DPD is configured as a storage device.

10. The computer program product of claim 5, wherein the base GUI is configured as a web framework page.

11. The computer program product of claim 5, wherein the interface tags are configured as an Extensible Markup Language (XML) file.

12. A system to customize a GUI, the system comprising:
a memory module;
a processor module comprising
a rendition module configured render a base graphical user interface (GUI) configured to provide an operator with tools for managing a plurality of data processing devices (DPD);

a tag module configured to communicate interface tags to the base GUI, wherein the interface tags are JavaServer Faces Tags and describe added functionality for managing a specified DPD, the base GUI is a Storage Management Initiative—Specification (SMI-S) compliant GUI, the added functionality is not supported by the base GUI, and the base GUI is not configured to employ the interface tags;

a translation module translate the interface tags into interpreted display code; and the rendition module further configured to insert the interpreted display code into code segments of the base GUI, modify a size and a position of base GUI elements to make room for elements rendered with the interpreted display code, and render the interpreted display code with the modified base GUI code segments to provide the added functionality for managing the specified DPD, wherein the operator may manage the specified DPD with the added functionality.

13. The system of claim 12, wherein the rendition module is configured as a browser.

14. The system of claim 12, wherein the interpreted display code is configured as Hypertext Markup Language (HTML) code.

15. The system of claim 12, wherein the interpreted display code is configured as script code.

16. The system of claim 12, wherein the plurality of DPD are configured as servers.

17. A method for deploying computer infrastructure, comprising integrating computer readable program stored on a computer readable storage device into a computing system, wherein the computer readable program executed by the computing system performs the following:

rendering a base graphical user interface (GUI) configured to provide an operator with tools for managing a plurality of storage devices;

communicating interface tags to the base GUI, wherein the interface tags are JavaServer Faces Tags and describe added functionality for managing a specified storage device, the base GUI is a Storage Management Initiative—Specification (SMI-S) compliant GUI, the added functionality is not supported by the base GUI, and the base GUI is not configured to employ the interface tags;

translating the interface tags into interpreted display code;

inserting the interpreted display code into code segments of the base GUI;

modifying a size and a position of base GUI elements to make room for elements rendered with the interpreted display code; and rendering the interpreted display code with the modified base GUI code segments to provide the added functionality for managing the specified storage device, wherein the operator may manage the specified storage device with the added functionality.

* * * * *